J. H. DENNIS.
Velocipede-Sled.

No. 223,118.     Patented Dec. 30, 1879.

WITNESSES:
Chas. Nida.
C. Sedgwick

INVENTOR:
J. H. Dennis
BY Munn & Co
ATTORNEYS.

UNITED STATES PATENT OFFICE.

JAMES H. DENNIS, OF NEWARK, NEW JERSEY.

IMPROVEMENT IN VELOCIPEDE-SLEDS.

Specification forming part of Letters Patent No. 223,118, dated December 30, 1879; application filed October 13, 1879.

*To all whom it may concern:*

Be it known that I, JAMES H. DENNIS, of Newark, in the county of Essex and State of New Jersey, have invented a new and useful Improvement in Velocipede-Sleds, of which the following is a specification.

The invention consists of a saddle, an open wheel-standard carrying an end-pivoted screw, a lever fulcrumed and connecting at one end with said screw and pivoted at the other end to a rod hooking on a spring-held crank-shaft, and of spike-wheels, as hereinafter described.

Figure 1:
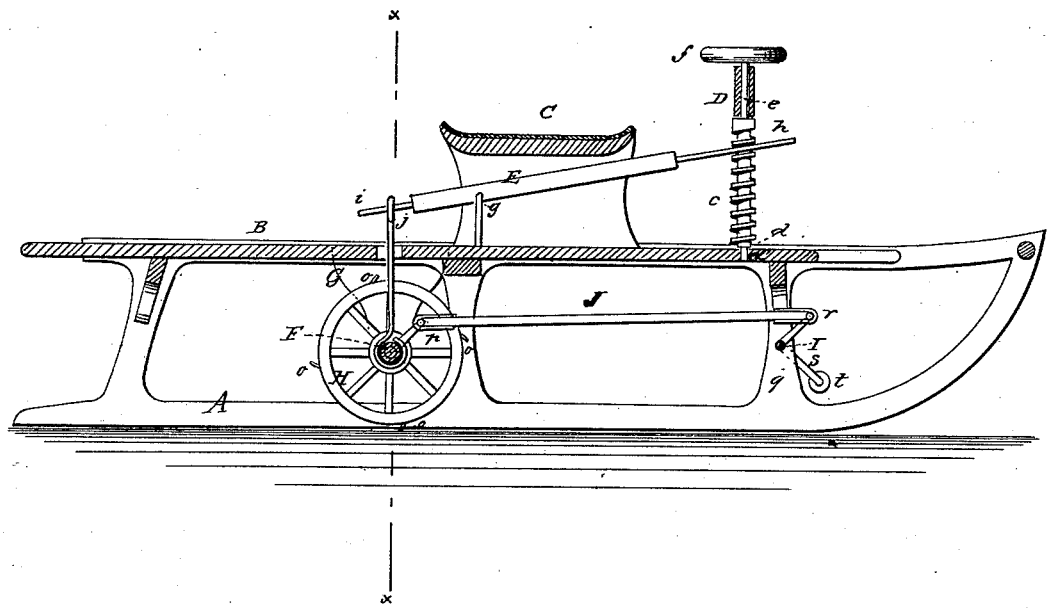
Figure 2:
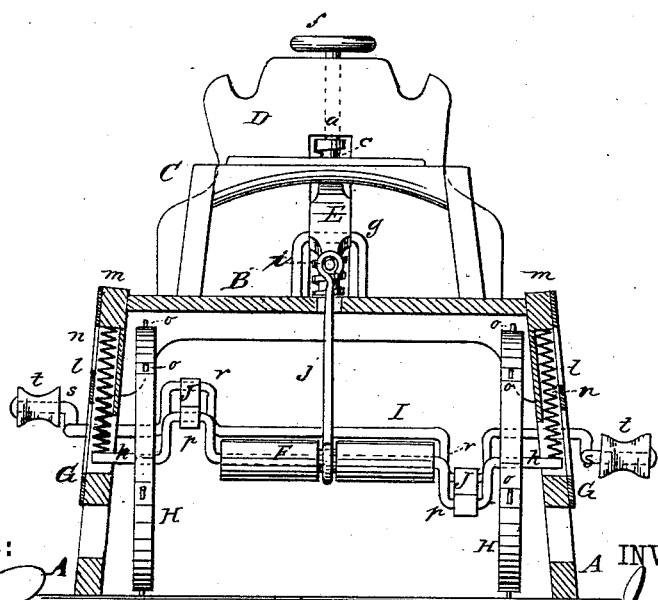

In the accompanying drawings, Figure 1 is a vertical longitudinal section of my improved sled, and Fig. 2 is a vertical cross-section of the same, taken on line $x\ x$ of Fig. 1.

Similar letters of reference indicate corresponding parts.

Referring to the drawings, A A are the runners of the sled. B is the floor, on which is placed a saddle, C, and in front of said saddle is a standard, D, provided with a vertical opening, $a$, in which is confined a screw, $c$, the lower end, $d$, whereof is pivoted at $d'$, while the upper end, $e$, is passed through the top of the standard D, and provided with a hand-wheel, $f$.

E is a lever fulcrumed at $g$, under saddle C, and having one end, $h$, engaged by screw $c$, while the opposite end, $i$, is pivoted to a rod, $j$, which is passed down through floor B and hooked to shaft F. The ends $k\ k$ of shaft F are held in vertical slots $l$ of hangers G, pendent from the side bars, $m\ m$, of the sled, and said ends $k$ are held down by springs $n$, housed in slots $l$.

H H are the traction-wheels, fixed to shaft F under floor B. Said wheels have in their peripheries a number of hooked spikes, $o$, which are adapted to take hold of the snow and ice.

By means of the screw $c$ the lever E can be raised and lowered. When raised it allows the shaft F to be forced down by the springs $n$, thus adjusting wheels H close to the ice and snow, so that the spikes $o$ will take hold thereof; but by depressing said lever the shaft F is raised and the wheels H thereby lifted from the surface of the snow and ice, whereby the sled is permitted to be moved without interference from the said wheels.

The shaft F is provided with cranks $p\ p$.

In the front knees, $q\ q$, is journaled a shaft, I, provided with inside cranks, $r\ r$, and outside the knees are foot-cranks $s\ s$, provided with foot-rests $t\ t$.

The cranks $r\ r$ are connected by connecting-rods J J with cranks $p\ p$ on shaft F, so that when shaft I is rotated its motion is communicated to shaft F and wheels H H.

The operator sits astride the saddle C, with his feet on foot-cranks $s\ s$, and works the same like the cranks of a velocipede. The motion is communicated to crank F and traction-wheels H, which take hold of the snow and ice, and thus propel the sled. When going downhill, and when the sled is propelled or drawn by other means, the wheels H can be raised from contact with the ice and snow, so as to avoid obstructing the movement of the sled.

Having thus described my invention, I claim as new and desire to secure by Letters Patent—

A sled-frame having the saddle C, open wheel-standard D, carrying end-pivoted screw $c$, and lever E, fulcrumed at $g$, said lever connecting at end $h$ with said screw, and pivoted at end $i$ to a rod hooking on the spring-held crank-shaft of spike-wheels H, as shown and described.

JAMES H. DENNIS.

Witnesses:
C. SEDGWICK,
JAMES M. HENLEY.